United States Patent [19]

Tanihara et al.

[11] Patent Number: 4,865,834

[45] Date of Patent: Sep. 12, 1989

[54] PROCESS FOR PRODUCING PLATE-LIKE MAGNETITE PARTICLES AND PLATE-LIKE MAGHEMITE PARTICLES

[75] Inventors: Mamoru Tanihara; Yoshiro Okuda; Hideaki Sadamura, all of Hiroshima, Japan

[73] Assignee: Toda Kogyo Corp., Hiroshima, Japan

[21] Appl. No.: 156,508

[22] Filed: Feb. 16, 1988

[30] Foreign Application Priority Data

Feb. 16, 1987 [JP] Japan ................................. 62-34141
Dec. 29, 1987 [JP] Japan ............................... 62-332467
Dec. 29, 1987 [JP] Japan ............................... 62-332468

[51] Int. Cl.$^4$ ..................... C01G 49/06; C01G 49/08
[52] U.S. Cl. .................................... 423/634; 423/632
[58] Field of Search ............................... 423/632, 634

[56] References Cited

U.S. PATENT DOCUMENTS

| | | | |
|---|---|---|---|
| 4,136,158 | 1/1979 | Okuda et al. | 423/632 |
| 4,202,871 | 5/1980 | Matsumoto et al. | 423/632 |
| 4,382,822 | 5/1983 | Mayer | 423/632 |
| 4,497,723 | 2/1985 | Ohlinger et al. | 423/634 |
| 4,597,958 | 7/1986 | Takagi et al. | 423/632 |

FOREIGN PATENT DOCUMENTS 61-14138 1/1986 Japan ................................. 423/632

OTHER PUBLICATIONS

Patent Abstracts of Japan, vol. 11, No. 132 (C-417) (2579) Apr. 24, 1987.

*Primary Examiner*—Jack Cooper
*Attorney, Agent, or Firm*—Nixon & Vanderhye

[57] ABSTRACT

Plate-like magnetite particles, plate-like maghemite particles and the processes for producing these particles are herein disclosed. The plate-like magnetite particles and the plate-like maghemite particles provided according to the present invention are fine plate-like particles which are poreless and non-sintered as the plate-like magnetite particles are produced directly from an aqueous solution and these plate-like magnetite particles are oxidized by heating to produce the plate-like maghemite particles. Therefore, these particles can be filled to a high density in a vehicle or resin, have good dispersibility and orientability and are also high in a degree of particle contact, so that they are suited for use as electromagnetic wave absorbing and shielding material, magnetic material for magnetic recording, black or brown pigment for paints and colorant for rubber and plastic products.

2 Claims, 11 Drawing Sheets

(×30000)

(×50000)

(x30000)

(×30000)

(x 30000)

(×30000)

(×18000)

PROCESS FOR PRODUCING PLATE-LIKE MAGNETITE PARTICLES AND PLATE-LIKE MAGHEMITE PARTICLES

BACKGROUND OF THE INVENTION

Magnetite particles and maghemite particles are generally used as electromagnetic wave absorbing material, electromagnetic wave shielding material or their base. Electromagnetic wave absorption or shielding is effected by coating an apparatus, etc., which is the source of generation of electromagnetic waves, with a coating material prepared by dispersing and mixing magnetite particles or maghemite particles in a vehicle.

Magnetite and maghemite particles are also widely used as a magnetic material for magnetic recording. Magnetic recording media such as magnetic tapes and magnetic discs are produced by coating the tapes or discs with a magnetic paint obtained by mixing magnetic particles such as magnetite and maghemite particles with a vehicle.

Further, because of their particular coloration, magnetite particles being black while maghemite particles assuming a brown color, these particles are commonly used as a pigment for paint in preparation of paint by mixing said particles with a vehicle. These particles are also used as a colorant by mixing them in rubber or plastic materials.

As described above, magnetite particles and maghemite particles are now used in the various fields of industry. In whatever field they may be used, it is the common requirements for these magnetite and maghemite particles to have the following characteristics: easy to work into a paint; capable of being filled to a high density in vehicles or resins; readily and well dispersible and orientable; and capable of effectuating a high degree of contact between the particles.

These requirements are mentioned, for instance, Japanese Patent Application Laid-Open (KOKAI) No. 104923/80 discloses that "There takes place a very remarkable parallel orientation of individual particles in the coating material ... This enables the particles to be filled to an extremely high density, making it possible to realize an increased anticorrosive effect, more effective shielding against the field of electromagnetic interference and elevated electroconductivity", and Japanese Patent Application Laid-Open (KOKAI) No. 28700/76 discloses that "The magnetic powder used in this invention is characterized by the fact that it can maintain a well satisfactory coating quality even if the packing density of the powder in organic binders is raised ... Drastic improvement of packing density of said magnetic powder has enabled it to have a high magnetic flux density." A relating mention is also made in PETROTECH, Vol. 9, No. 6 (1986) which discloses on page 494 that "This is classified into the field of material technology for electromagnetic wave shielding ... It is a conductive coating method which is most popularly used at present ... Fine particles of nickel, etc., are mixed in the paint ... Contact between metals is essential ... Particles with a high degree of contact are selected. . ."

For meeting the above characteristic requirements, magnetite and maghemite particles must be a plate-like fine particles.

This fact is mentioned in many patent applications. For instance, aforementioned Japanese Patent Application Laid-Open (KOKAI) No. 28700/76 discloses that "It is intended to provide a uniform magnetic coating having a high degree of packing of magnetic powder and excellent magnetic properties by coating an essentially plate-like magnetic powder ... " Also, Japanese Patent Application Laid-Open (KOKAI) No. 104923/80 discloses that "There are other uses of hexagonal flaky (plate-like) iron oxide having a magnetite or maghemite structure ... There takes place a very remarkable parallel orientation (orientability) of individual particles ... This enables the particles to be filled to an extremely high density ... Japanese Patent Application Laid-Open (KOKAI) No. 266311/86 discloses that "Use of fine plate-like ferromagnetic powder of cobalt-containing iron oxide having a particle size of not more than 1 $\mu$m would make it possible to provide magnetic recording media having good dispersibility and filling characteristics of powder and excellent surface smoothness."

The following methods are known for producing the plate-like magnetite particles: the method in which an alkaline suspension containing ferric hydroxide or goethite is autoclaved to produce plate-like hematite particles from the aqueous solution and these plate-like hematite particles are reduced under heating in a reducing gas; and the method in which by rapidly oxidizing ferrous hydroxide contained in an alkaline suspension with a strong oxidizing agent, or by reacting a ferric salt and an alkali in an aqueous medium in the presence of a specific additive to form ferric hydroxide, then this ferric hydroxide is autoclaved, plate-like goethite particles are produced from the aqueous solution and these plate-like goethite particles are dehydrated by heating and then reduced under heating in a reducing gas.

In the former method are included the processes disclosed in aforementioned Japanese Patent Application Laid-Open (KOKAI) Nos. 28700/76 and 104923/80. The processes proposed in aforementioned Japanese Patent Application Laid-Open (KOKAI) Nos. 266311/86 and 104923/80 are included in the example of the latter method.

As the method for producing plate-like maghemite particles, there are known the method in which an alkaline suspension containing ferric hydroxide or goethite is autoclaved to produce the plate-like hematite particles from the aqueous solution, and these plate-like hematite particles are reduced under heating in a reducing gas and then oxidized under heating; and the method in which by rapidly oxidizing ferrous hydroxide contained in an alkaline suspension with a strong oxidizing agent, or by reacting a ferric salt and an alkali in an aqueous medium in the presence of a specific additive to form ferric hydroxide, then this ferric hydroxide is autoclaved, plate-like goethite particles are produced from the aqueous solution, and these plate-like goethite particles are dehydrated by heating, then reduced under heating in a reducing gas and oxidized under heating.

As the example of the former method, there are the processes disclosed in aforementioned Japanese Patent Application Laid-Open (KOKAI) Nos. 28700/76 and 104923/80, and included in the latter method are the processes shown in aforementioned Japanese Patent Application Laid-Open (KOKAI) Nos. 266311/86 and 104923/80.

Plate-like magnetite particles and plate-like maghemite particles capable of high packing density and having excellent dispersibility and orientability are most ardently required at present. In production of such magnetite and maghemite particles according to the known methods as mentioned above, there tends to take place sintering of or between the particles due to the rapid growth of unit particles when the plate-like hematite particles produced from the aqueous solution are reduced under heating in a reducing gas. Consequently, it becomes difficult to disperse the particles in a vehicle or resin, resulting in a reduced packing density and poor orientability. As is well known, in the step of heating and oxidizing plate-like magnetite particles to form plate-like maghemite particles, there takes place no growth of unit particles and accordingly no sinter of or between the particles occurs.

Further, in case of using the former type of method described above, it is difficult to produce the fine plate-like hematite particles having an average diameter of not more than 1 μm, especially not more than 0.5 μm, from the aqueous solution. Naturally, it is difficult to obtain plate-like maghemite particles having an average diameter of plate surface of not more than 1 μm, especially not more than 0.5 μm by reducing said hematite particles under heating and to obtain plate-like maghemite particles having an average diameter of plate surface of not more than 1 μm, especially not more than 0.5 μm by oxidizing the resulting plate-like magnetite particles. This fact is seen from, for instance, the statement in aforementioned Japanese Patent Application Laid-Open (KOKAI) No. 28700/76 which discloses that "Hexagonal plate-like hematite ($\alpha$-$Fe_2O_3$) occurs in nature as micaceous iron oxide and has been known and used as an inorganic anti-corrosive paint. Recently, it has become possible to artificially synthesize this compound, ... Such synthetic iron oxide is about 1 to 40 μ in plate diameter ... "

In case of using the latter type of method described above, the obtained plate-like magnetite and maghemite particles have many pores on the particle surface and in the inside of particle as a result of dehydration in the goethite crystal particles when they are heated. When such porous plate-like magnetite or maghemite particles are dispersed in a vehicle or resin, the magnetically polarized surface portions attract other fine particles, causing aggregation of many particles to form aggregates of fairly large sizes. This makes it difficult to effect desired dispersion, resulting in a reduced packing density and poor orientability.

As understood from the foregoing statement, the establishment of a process capable of directly producing fine plate-like magnetite particles from an aqueous solution has been strongly desired for obtaining the poreless and non-sintered fine plate-like magnetite and maghemite particles.

Extensive studies have been made by the present inventors in search of such process, and as a result, the process of the present invention has been accomplished.

SUMMARY OF THE INVENTION

In a first aspect of the present invention, there are provided poreless and non-sintered plate-like magnetite particles having an average diameter of plate surface of 0.03 to 0.50 μm, an aspect ratio (plate surface diameter:thickness, hereinafter referred as "aspect ratio") of 2:1 to 10:1 and a specific surface area of 7 to 30 m²/g.

In a second aspect of the present invention, there are provided poreless and non-sintered plate-like maghemite particles having an average diameter of plate surface of 0.03 to 0.50 μm, an aspect ratio of 2:1 to 10:1 and a specific surface area of 7 to 30 m²/g.

In a third aspect of the present invention, there is provided a process for producing poreless and non-sintered plate-like magnetite particles, which comprises mixing an aqueous solution of a ferrous salt and an aqueous solution of an alkali carbonate to form an aqueous solution containing $FeCO_3$ and passing an $O_2$-containing gas through said $FeCO_3$-containing solution for oxidizing $FeCO_3$ to form plate-like magnetite particles, wherein said mixing is carried out by reacting said ferrous salt and said alkali carbonate at a molar ratio defined by the following formula:

$$1 \leq \frac{CO_3^{2-} \text{ (mol)}}{Fe^{2+} \text{ (mol)}} \leq \frac{0.13}{(FeCO_3 \text{ concent. (mol/l)})^2} + 0.6 \quad \text{(I)}$$

and said oxidation is carried out by previously adding an aliphatic oxycarboxylic acid or a salt thereof in an amount of 0.01 to 2.0 mol % based on Fe to either of said aqueous solution of ferrous salt, said aqueous solution of alkali carbonate or said $FeCO_3$-containing aqueous solution before passing said oxygen-containing gas therethrough.

In a fourth aspect of the present invention, there is provided a process for producing poreless and non-sintered plate-like maghemite particles, which comprises mixing an aqueous solution of a ferrous salt and an aqueous solution of an alkali carbonate to form an aqueous solution containing $FeCO_3$; passing an $O_2$-containing gas through said $FeCO_3$-containing solution for oxidizing $FeCO_3$ to form plate-like magnetite particles, wherein said mixing is carried out by reacting said ferrous salt and said alkali carbonate at a molar ratio defined by the following formula:

$$1 \leq \frac{CO_3^{2-} \text{ (mol)}}{Fe^{2+} \text{ (mol)}} \leq \frac{0.13}{(FeCO_3 \text{ concent. (mol/l)})^2} + 0.6 \quad \text{(I)}$$

and said oxidation is carried out by previously adding an aliphatic oxycarboxylic acid or a salt thereof in an amount of 0.01 to 2.0 mol % based on Fe to either of said aqueous solution of ferrous salt, said aqueous solution of alkali carbonate or said $FeCO_3$-containing solution before passing said $O_2$-containing gas therethrough; and oxidizing said plate like magnetite particles by heating them at a temperature of 240° to 400 °C. in the air.

DETAILED DESCRIPTION OF THE INVENTION

Figure 1:
FIG. 1 and FIG. 3 are the electron microphotographs of the plate-like magnetite particles obtained in Example 1 and Example 8, respectively.

The present invention relates to the poreless and non-sintered plate-like magnetite particles having an average diameter of plate surface of 0.03 to 0.50 μm, an aspect ratio of 2:1 to 10:1 and a specific surface area of 7 to 30 m²/g; the poreless and non-sintered plate-like maghemite particles having an average diameter of plate surface of 0.03 to 0.50 μm, an aspect ratio of 2:1 to 10:1 and a specific surface area of 7 to 30 m²/g; a process for producing the poreless and non-sintered plate-like magnetite particles comprising mixing an aqueous solution of a ferrous salt and an aqueous solution of an alkali carbonate to form an aqueous solution containing $FeCO_3$ and passing an $O_2$-containing gas through the $FeCO_3$-containing solution for oxidizing $FeCO_3$ to form plate-like magnetite particles, wherein the mixing is carried out by reacting the ferrous salt and the alkali carbonate at a molar ratio defined by the following formula (I):

$$1 \leq \frac{CO_3^{2-} \text{ (mol)}}{Fe^{2+} \text{ (mol)}} \leq \frac{0.13}{(FeCO_3 \text{ concent. (mol/l)})^2} + 0.6 \quad (I)$$

and the oxidation is carried out by previously adding an aliphatic oxycarboxylic acid or a salt thereof in an amount of 0.01 to 2.0 mol % based on Fe to either of the aqueous solution of ferrous salt, the aqueous solution of alkali carbonate or the $FeCO_3$-containing solution before passing the $O_2$-containing gas therethrough; and a process for producing the poreless and non-sintered plate-like maghemite particles comprising oxidizing the plate-like magnetite particles obtained from the above-described process by heating in the air.

In the present invention, it is important that when an aqueous solution containing $FeCO_3$ is prepared by mixing an aqueous solution of a ferrous salt and an aqueous solution of an alkali carbonate, the reaction is carried out by reacting a ferrous salt and an alkali carbonate at a molar ratio defined by the following formula (I):

$$1 \leq \frac{CO_3^{2-} \text{ (mol)}}{Fe^{2+} \text{ (mol)}} \leq \frac{0.13}{(FeCO_3 \text{ concent. (mol/l)})^2} + 0.6 \quad (I)$$

and that an aliphatic oxycarboxylic acid or a salt thereof is previously added in an amount of 0.01 to 2.0 mol %, preferably 0.1 to 1.0 mol % based on Fe to either of the aqueous solution of ferrous salt, the aqueous solution of alkali carbonate or the $FeCO_3$-containing solution before oxidizing by passing an $O_2$-containing gas therethrough, and then an $O_2$-containing gas is passed through the $FeCO_3$ containing solution for oxidizing $FeCO_3$ thereby producing the plate-like magnetite particles directly from said solution.

Typical examples of the aqueous solutions of ferrous salt usable in the present invention are an aqueous solution of ferrous sulfate and an aqueous solution of ferrous chloride.

The alkali carbonates usable in the present invention include sodium carbonate, potassium carbonate, ammonium carbonate and the like, which may be used either singly or in combination.

As for the order of addition of the aqueous solutions of ferrous salt and alkali carbonate into a reaction vessel, either of these solutions may be added first or both solutions may be added simultaneously.

The reaction for oxidizing $FeCO_3$ is carried out in the present invention at a temperature in the range of 75° to 100° C., preferably 80° to 100° C.

The molar ratio of alkali carbonate to ferrous salt used in the reaction in the present invention is defined as follows:

$$1 \leq \frac{CO_3^{2-} \text{ (mol)}}{Fe^{2+} \text{ (mol)}} \leq \frac{0.13}{(FeCO_3 \text{ concent. (mol/l)})^2} + 0.6$$

When the molar ratio exceeds the above-specified range of value, spindle-like hematite particles may be caused to exist in the plate-like magnetite particles. Taking productivity into account, the lower limit of ferrous salt concentration in the $FeCO_3$-containing solution is preferably around 0.1 mol/l.

In the present invention, an aliphatic oxycarboxylic acid or a salt thereof is used. Typical examples of aliphatic oxycarboxylic acids usable in the present invention include citric acid and tartaric acid, and the salts thereof usable in the present invention include sodium citrate, potassium citrate, lithium citrate, ammonium citrate, sodium tartrate, potassium tartrate, lithium tartrate and ammonium tartrate.

The amount of aliphatic oxycarboxylic acid or the salt thereof used in the present invention is in the range of 0.01 to 2.0 mol %, preferably 0.1 to 1.0 mol % based on Fe. When less than 0.01 mol %, granular hematite particles and/or acicular goethite particles may be caused to exist in the plate-like magnetite particles. When over 2.0 mol %, although the magnetite particles are produced, the magnetite particles are greatly reduced in saturation magnetization.

The aliphatic oxycarboxylic acid or the salt thereof used in the present invention exerts an influence to the type and form of the produced particles under the synergism with the alkali carbonate. Therefore, the acid or the salt thereof needs to be added before the reaction for producing the plate-like magnetite particles is started. It may be added to either of the ferrous salt solution, the alkali carbonate solution or the $FeCO_3$-containing solution before oxidizing by passing an $O_2$-containing gas therethrough.

An aqueous solution of a ferrous salt and an aqueous solution of an alkali carbonate are mixed under the conditions mentioned above to obtain an aqueous solution containing $FeCO_3$ and then an $O_2$-containing gas is passed through the $FeCO_3$-containing solution at a temperature of 75° to 100° C., preferably 80° to 100° C. to produce the plate-like magnetite particles of the present invention. When this reaction temperature is below 75° C., spindle-like hematite particles and/or acicular goethite may be caused to exist in the plate-like magnetite particles. When the reaction temperature exceeds 100° C., use of a specific apparatus such as autoclave is necessitated for attaining the object of the present invention, resulting in poor economy. Air is preferably used as the $O_2$-containing gas, but a mixed gas having $O_2$ diluted with an inert gas such as $N_2$ is also usable.

When the $FeCO_3$-containing solution is first subjected to an aging treatment by blowing a non-oxidizing gas such as nitrogen gas into the solution at 50° to 100° C., preferably 80° to 100° C. and preferably for 15 to 40 minutes, while stirring it if necessary, and then the $O_2$- containing gas is passed through the solution to oxidize $FeCO_3$, there can be obtained the plate-like magnetite particles having a large aspect ratio (plate surface diameter:thickness).

The plate-like magnetite particles obtained in the manner described above are oxidized in the air under heating at a temperature of 200° to 400° C. by a conventional method, thereby producing the plate-like maghemite particles of the present invention.

The plate-like magnetite particles of the present invention are the fine particles having an average diameter of plate surface of 0.03 to 0.50 μm, preferably 0.05 to 0.40 μm, an aspect ratio plate surface diameter:thickness of 2:1 to 10:1, preferably 3:1 to 8:1. These particles are also poreless and non-sintered as produced directly from an aqueous solution.

The plate-like magnetite particles of the present invention, although the particles are fine as specified above, are small in specific surface area, which is 7 to 30 $m^2/g$, preferably 8.0 to 25.0 $m^2/g$, owing to poreless structure thereof. Also, as the particles are plate-like, poreless and non-sintered, the particles can be easily worked into a paint, have good dispersibility and orientability and can be filled to a high density in a vehicle or resin.

The plate-like maghemite particles provided according to the present invention are also the fine particles having an average diameter of plate surface of 0.03 to 0.50 μm, preferably 0.05 to 0.40 μm, an aspect ratio plate surface diameter/thickness) of 2:1 to 10:1, preferably 3:1 to 8:1. These particles are poreless as they are obtained from the magnetite particles produced directly from an aqueous solution and are also non-sintered as no heating reduction treatment is involved in the producing process therefor.

The plate-like maghemite particles of the present invention are also small in specific surface area (7 to 30 $m^2/g$, preferably 8 to 25 $m^2/g$) owing to the poreless structure thereof, and as the particles are plate-like, poreless and non-sintered, the maghemite particles of the present invention are easy to work into a paint, have good dispersibility and orientability and can be filled to a high density in a vehicle or resin.

The plate-like magnetite and maghemite particles according to the present invention find particularly useful applications to electromagnetic wave absorbers, electromagnetic wave shields, magnetic recording media, black or brown pigment for paints and colorant for rubber and plastic products or as the base material therefor.

The present invention will hereinafter be described more in detail while referring to the following non-limitative examples.

In the following Examples and Comparative Examples, the average diameter of plate surface and the aspect ratio (plate surface diameter:thickness) of the particles were shown by the average of the values determined from the electron microphotographs. Specific surface area was measured according to the BET method. Magnetic properties were determined in a magnetic field of 10 kOe by using a vibrating sample magnetometer Model VSMP-1 (made by TOEI KOGYO KK).

EXAMPLE 1

Under an $N_2$ gas stream, 0.83 liters of a 1.35 mol/l aqueous solution of ferrous sulfate was added to 3.67 liters of a 0.62 mol/l $Na_2CO_3$ aqueous solution ($CO_3$/Fe=2.0 (molar ratio)) which had been added with 1.65 g of trisodium citrate dihydrate so that the amount thereof would become 0.5 mol % based on Fe and prepared in a reactor, and the solutions were kept at 60° C. to produce $FeCO_3$. The iron concentration in the mixed solution was 0.25 mol/l. Then an $N_2$ gas was blown into the $FeCO_3$-containing solution at a rate of 15 l/min to effect aging at 85° C. for 30 minutes, and then air was passed through the solution at a rate of 18 l/min at 85° C. for 2.0 hours to produce the particles.

The end point of oxidization reaction was judged by sampling out a part of the reaction solution, acidifying the sample solution with hydrochloric acid and then putting a portion of potassium ferricyanide solution into the sample solution to see whether a blue color reaction of $Fe^{2+}$ would take place or not.

The produced particles were filtered, washed with water, dried and disaggregated in the usual ways. The produced particles were determined to have an average diameter of 0.39 μm by transmission electron microscopical observation. As seen from the scanning electron microphotographs (30,000×magnification) shown in FIG. 1, the produced particles were plate-like with an aspect ratio (plate surface diameter:thickness) of 8:1 and had no pores both on the surface and in the particles.

Also, the particles had a BET specific surface area of 8.5 $m^2/g$ and showed the following magnetic properties: coercive force Hc=110 Oe, saturation magnetization σs=87.8 emu/g, squareness ratio (σr/σs)=0.168.

Figure 2:
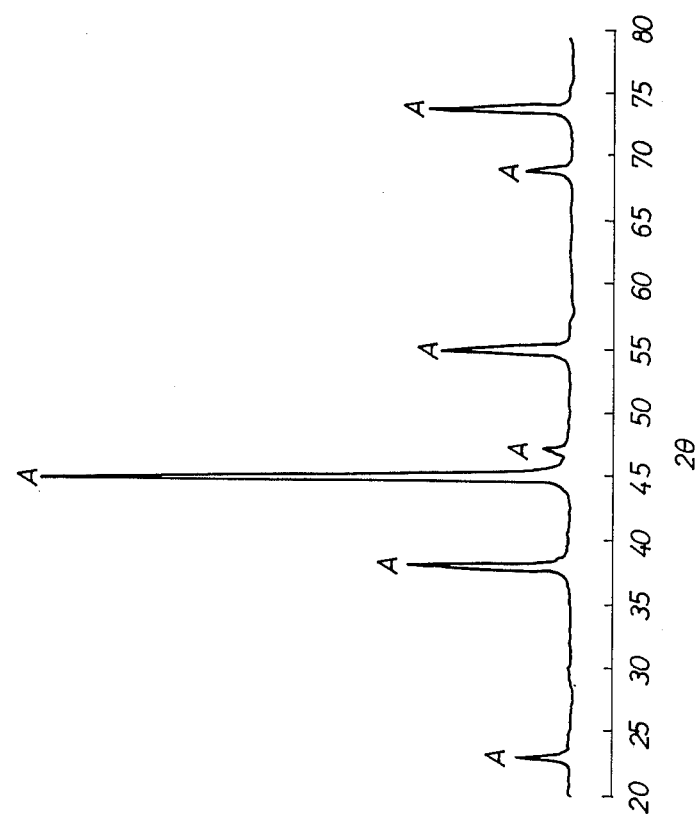
FIG. 2, FIG. 4, FIG. 6, FIG. 8 and FIG. 10 are the X-ray diffraction patterns of the particles obtained in Example 1, Example 8, Comparative Example 1, Comparative Example 2 and Comparative Example 3, respectively.

An X-ray diffraction pattern of the particles is shown in FIG. 2. Peak A represents magnetite, which indicates that the particles are composed of magnetite alone.

EXAMPLES 2-10

Plate-like magnetite particles were obtained by following the same procedure as Example 1 except for change of the kind, concentration and amount of the ferrous salt solution, the kind, concentration of the alkali carbonate solution, $CO_3$/Fe molar ratio, the kind and amount of the aliphatic oxycarboxylic acid or the salt thereof, the order of addition of the ferrous salt solution and the alkali carbonate solution, the Fe concentration and reaction temperature in the $FeCO_3$ producing step, the temperature and time of the aging step, and the reaction temperature and time of the oxidization reaction step.

The principal production conditions used in the above-described examples and the properties of the obtained products are shown in Tables 1-3.

Only the peaks of magnetite appeared on the X-ray diffraction patterns of the particles obtained in Examples 2-10. Also, the results of scanning electron microscopical observation showed that all of these particles were platelike and had no pores on the surface and in the inside.

Figure 3:
Figure 4:
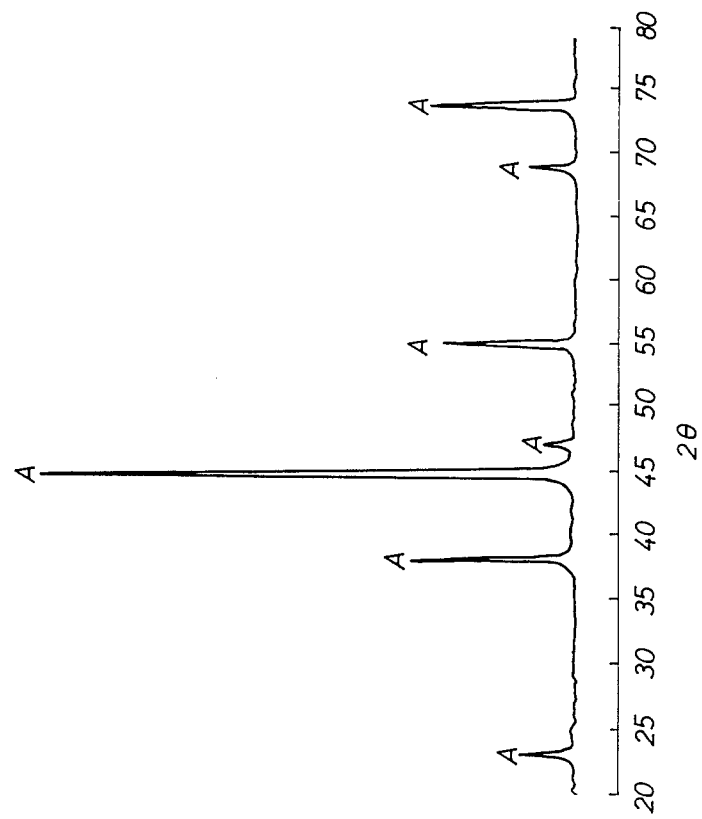

A transmission electron microphotograph (50,000×magnification) of the particles obtained in Example 8 is shown in FIG. 3, and an X-ray diffraction pattern thereof is shown in FIG. 4.

COMPARATIVE EXAMPLE 1

Figure 5:
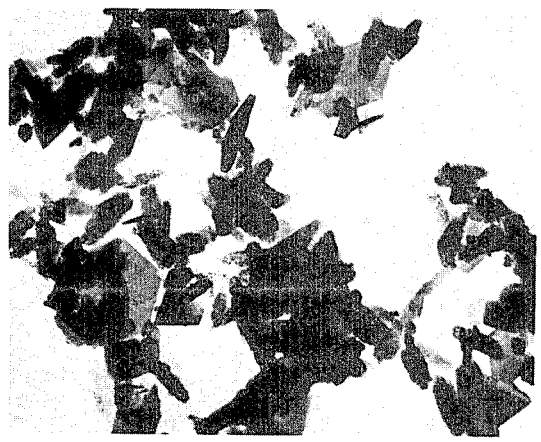
FIG. 5 and FIG. 7 are the electron microphotographs of the mixtures of plate-like magnetite particles and spindle-like hematite particles obtained in Comparative Example 1 and Comparative Example 2, respectively.
Figure 6:
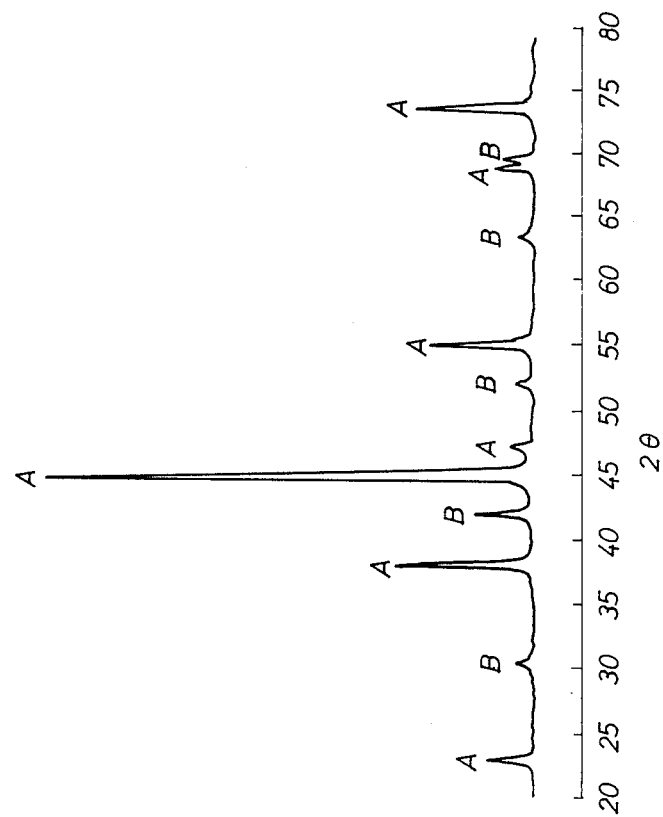

By following the same procedure as Example 1 except that ferrous sulfate solution was added to 3.67 liters of a 1.08 mol/l $Na_2CO_3$ solution containing trisodium citrate dihydrate ($CO_3$/Fe molar ratio=3.5), there were produced the particles from the aqueous solution. The produced particles were filtered, washed with water, dried and disaggregated in the ordinary ways. As seen from a transmission electron microphotograph (30,000×magnification) shown in FIG. 5, there were present both plate-like particles and spindle-like particles mingled with each other. The X-ray diffraction pattern (FIG. 6) of the particles showed the peaks of both magnetite (A) and hematite (B).

COMPARATIVE EXAMPLE 2

Figure 7:
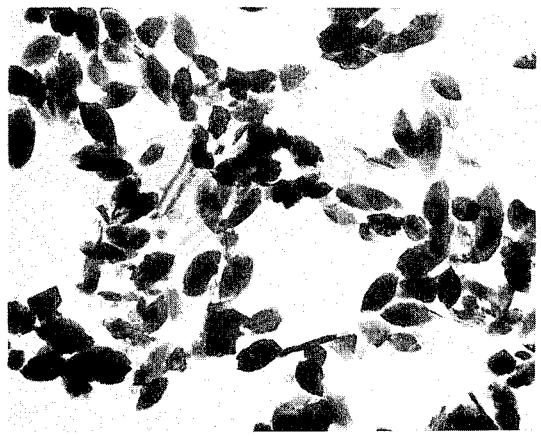

Particles were produced in the same way as Example 6 except that ferrous sulfate solution was added to 3.67 liters of a 1.08 mol/l $Na_2CO_3$ solution ($CO_3$/Fe molar ratio =3.5) containing tartaric acid. The produced particles were filtered, washed with water, dried and disaggregated in the usual ways. As seen from a transmission electron microphotograph (30,000×magnification) shown in FIG. 7, the obtained particles comprised plate-like particles and spindle-like particles mingled with each other.

Figure 8:
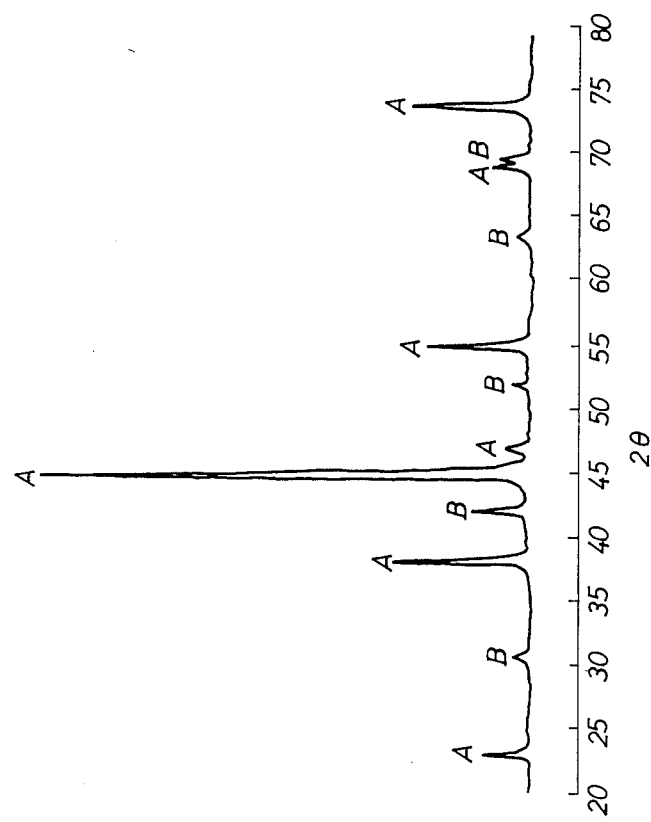

The peaks of magnetite (A) and hematite (B) appeared on the X-ray diffraction pattern of the particles shown in FIG. 8.

COMPARATIVE EXAMPLE 3

Figure 9:
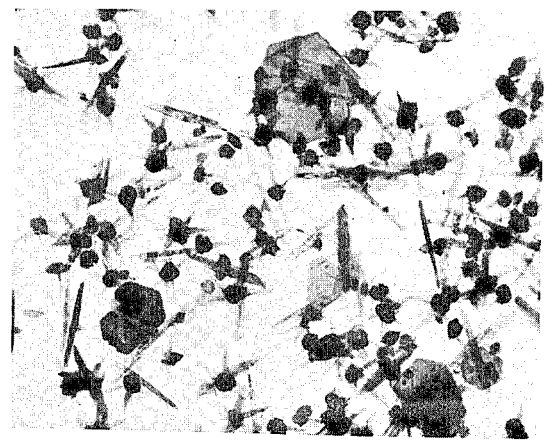
FIG. 9 is an electron microphotograph of a mixture of plate-like magnetite particles, granular hematite particles and acicular goethite particles obtained in Comparative Example 3.

The procedure of Example 1 was followed without adding trisodium citrate dihydrate to produce the particles from the aqueous solution. The produced particles were filtered, washed with water, dried and disaggregated in the ordinary ways. The obtained particles comprised plate-like particles, spindle-like particles and acicular particles mingled with each other as seen from a transmission electron microphotograph (30,000×magnification) shown in FIG. 9.

Figure 10:
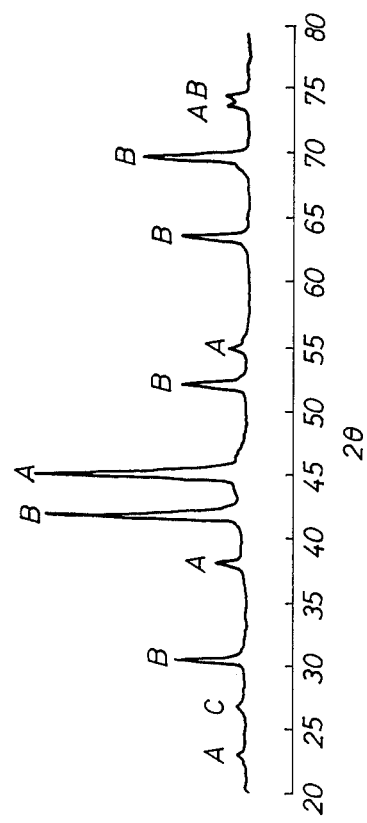

The X-ray diffraction pattern (FIG. 10) of the particles showed the peaks of magnetite (A), hematite (B) and goethite (C).

COMPARATIVE EXAMPLE 4

The procedure of Example 1 was followed except for adding 9.9 g (corresponding to 3.0 mol % based on Fe) of trisodium citrate dihydrate to produce the particles from the aqueous reaction solution, and the produced particles were filtered, washed with water, dried and disaggregated as in the previous examples.

The obtained particles showed the following magnetic properties: coercive force Hc=110 Oe; saturation magnetization $\sigma s$=72.2 emu/g; squareness ratio ($\sigma r/\sigma s$)=0.140.

COMPARATIVE EXAMPLE 5

The procedure of Example 1 was followed with both the aging temperature and the oxidization temperature adjusted to 70° C. to produce the particles from the aqueous reaction solution. The produced particles were filtered, washed with water, dried and disaggregated in the usual ways.

Transmission electron microscopical observation of the obtained particles showed that there were present plate-like particles, granular particles and acicular particles mingled with each other. Also, the X-ray diffraction pattern of the particles showed the peaks of magnetite, hematite and goethite.

EXAMPLE 11

70 g of plate-like magnetite particles obtained in Example 1 were heated in the air at 300° C. for 30 minutes to obtain the maghemite particles.

Figure 11:
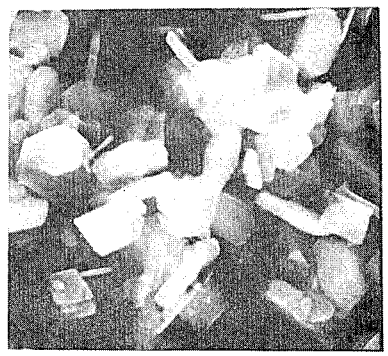
FIG. 11 and FIG. 12 are the electron microphotographs of plate-like maghemite particles obtained in Example 11 and Example 18, respectively.

The obtained maghemite particles were determined to have an average diameter of 0.39 μm by transmission electron microscopical observation. Also, as seen from a scanning electron microphotograph (30,000×magnification) shown in FIG. 11, these particles were all plate-like with an aspect ratio of 8:1 and had no pores both on the surface and in the inside.

These plate-like maghemite particles had a BET specific surface area of 8.8 m²/g and showed the following magnetic properties: coercive force Hc=115 Oe; saturation magnetization $\sigma s$=70.5 emu/g; squareness ratio ($\sigma r/\sigma s$)=0.185.

EXAMPLES 12-20

Plate-like maghemite particles were obtained by following the same procedure as Example 11 except hat the kind of plate-like magnetite particles and the oxidization temperature were changed.

The main production conditions used in these Examples and the properties of the obtained products are shown in Table 3.

X-ray diffraction of the particles obtained in Examples 12-20 showed only the peaks of maghemite. Also, scanning electron microscopical observation confirmed that these particles were all plate-like and had no pores on the surface and in the inside.

Figure 12:
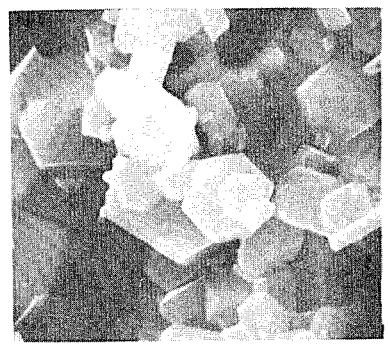

A transmission electron microphotograph (18,000×magnification) of the particles obtained in Example 18 is shown in FIG. 12.

TABLE 1

| | Ferrous salt solution | | | Formation of FeCO₃ Alkali carbonate solution | | | | Aliphatic oxycarboxylic acid or its salt | | | Order of addi-tion* | Fe/ total amount (mol/l) | Reaction temp. (°C) | Aging | | Oxidization reaction | |
|---|---|---|---|---|---|---|---|---|---|---|---|---|---|---|---|---|---|
| Example | Kind | Concentration (mol/l) | Amount (l) | Kind | Concentration (mol/l) | Amount (l) | CO₃/Fe (molar ratio) | Kind | Amount (g) | Amount (mol %) | | | | Temp. (°C) | Time (min) | Temp. (°C) | Time (hr) |
| Example 1 | FeSO₄ | 1.35 | 0.83 | Na₂CO₃ | 0.62 | 3.67 | 2.0 | Trisodium citrate dihydrate | 1.65 | 0.5 | A | 0.25 | 60 | 85 | 30 | 85 | 2.0 |
| 2 | " | " | 0.33 | " | 0.22 | 4.17 | 2.0 | " | 0.66 | 0.5 | " | 0.1 | 60 | " | " | 85 | 1.0 |
| 3 | " | " | 1.00 | " | 0.78 | 3.50 | 1.5 | " | 1.99 | " | " | 0.3 | 85 | — | — | " | 2.5 |
| 4 | " | " | 0.60 | " | 0.42 | 3.90 | 3.5 | " | 1.19 | " | B | 0.18 | 85 | 85 | 30 | " | 2.0 |
| 5 | " | " | 1.33 | " | 0.71 | 3.17 | 1.25 | " | 1.06 | 0.2 | A | 0.40 | 60 | 90 | " | 90 | 3.5 |
| 6 | " | 1.08 | 0.83 | " | 0.62 | 3.67 | 2.0 | Tartaric acid | 0.67 | 0.5 | " | 0.20 | 60 | 90 | 30 | " | 2.5 |
| 7 | " | 1.35 | 0.33 | Na₂CO₃ | 0.22 | 4.17 | 2.0 | " | 0.33 | " | " | 0.10 | 60 | 85 | " | 85 | 1.0 |
| Example 8 | FeSO₄ | 1.35 | 1.00 | " | 0.78 | 3.50 | 1.5 | Tartaric acid | 1.01 | 0.5 | A | 0.30 | 85 | — | — | 85 | 2.5 |
| 9 | " | " | 0.60 | " | 0.42 | 3.90 | 3.5 | " | 0.61 | " | B | 0.18 | 85 | 85 | 30 | " | 2.0 |
| 10 | " | " | 1.33 | " | 0.71 | 3.17 | 1.25 | Sodium tartrate | 0.70 | 0.2 | A | 0.40 | 60 | 90 | " | 90 | 3.0 |
| Comp. Example 1 | " | 1.35 | 0.83 | " | 1.08 | 3.67 | 3.5 | Trisodium citrate dihydrate | 1.65 | 0.5 | A | 0.25 | 60 | 85 | 30 | 85 | 2.0 |
| 2 | " | 1.08 | " | " | " | " | " | Tartaric acid | 0.67 | 0.5 | — | " | " | " | " | " | " |
| 3 | " | 1.35 | " | " | 0.62 | " | 2.0 | — | — | — | A | " | " | " | " | " | " |
| 4 | " | " | " | " | " | " | " | " | 9.9 | 3.0 | " | " | 70 | 70 | " | 70 | " |

*A: Added to alkali carbonate solution.
B: Added to ferrous salt solution.
C: Added to FeCO₃-containing solution.

TABLE 2

| | Plate-like magnetite particles ||||||
| | Particle properties |||| Magnetic properties |||
| Example | Average diameter of plate surface | Aspect ratio | Pores | Specific surface area ($m^2/g$) | Coercive force (Hc) | Saturation magnetization ($\sigma s$) | Squareness ratio |
|---|---|---|---|---|---|---|---|
| Example | | | | | | | |
| 1 | 0.39 | 8:1 | None | 8.5 | 110 | 87.8 | 0.168 |
| 2 | 0.06 | 6:1 | " | 23.6 | 95 | 86.2 | 0.158 |
| 3 | 0.20 | 3:1 | " | 9.8 | 84 | 88.2 | 0.106 |
| 4 | 0.15 | 6:1 | " | 12.9 | 113 | 87.5 | 0.152 |
| 5 | 0.22 | 4:1 | " | 10.3 | 98 | 87.0 | 0.141 |
| 6 | 0.30 | 8:1 | " | 8.8 | 115 | 87.0 | 0.125 |
| 7 | 0.16 | 6:1 | " | 12.8 | 105 | 86.8 | 0.165 |
| 8 | 0.35 | 8:1 | " | 8.5 | 120 | 88.2 | 0.135 |
| 9 | 0.21 | 6:1 | " | 10.5 | 115 | 87.8 | 0.155 |
| 10 | 0.25 | 5:1 | " | 10.5 | 105 | 87.2 | 0.123 |

TABLE 3

| | Plate like magnetite particles used | Oxidization temperature (°C.) | Plate-like maghemite particles ||||||
| | | | Particle properties |||| magnetic properties |||
| Example | | | Average diameter of plate surface | Aspect ratio | Pores | Specific surface area ($m^2/g$) | Coercive force (Hc) | Saturation magnetization ($\sigma s$) | Squareness ratio |
|---|---|---|---|---|---|---|---|---|---|
| Example | Example | | | | | | | | |
| 11 | 1 | 300 | 0.39 | 8:1 | None | 8.8 | 115 | 70.5 | 0.185 |
| 12 | 2 | " | 0.06 | 6:1 | " | 24.4 | 95 | 63.5 | 0.165 |
| 13 | 3 | " | 0.20 | 3:1 | " | 10.1 | 102 | 73.8 | 0.135 |
| 14 | 4 | " | 0.15 | 6:1 | " | 13.3 | 108 | 69.8 | 0.133 |
| 15 | 5 | " | 0.22 | 4:1 | " | 10.7 | 98 | 73.5 | 0.151 |
| 16 | 6 | 280 | 0.30 | 8:1 | " | 9.1 | 125 | 71.0 | 0.145 |
| 17 | 7 | " | 0.16 | 6:1 | " | 13.2 | 108 | 70.2 | 0.165 |
| 18 | 8 | 300 | 0.35 | 8:1 | " | 8.8 | 128 | 73.2 | 0.140 |
| 19 | 9 | " | 0.21 | 6:1 | " | 10.9 | 105 | 72.5 | 0.155 |
| 20 | 10 | " | 0.25 | 5:1 | " | 11.0 | 98 | 71.5 | 0.112 |

What is claimed is:

1. A process for producing poreless and non-sintered plate-like magnetite particles having an average plate surface diameter of 0.03 to 0.50 μm and a specific surface area of 7 to 30 $m^2/g$, which process comprises
mixing an aqueous solution of a ferrous salt and an aqueous solution of an alkali carbonate to form an aqueous solution containing $FeCO_3$, and
passing an $O_2$-containing gas through said $FeCO_3$-containing solution to oxidize the $FeCO_3$ to form the plate-like magnetite particles,
wherein said mixing is carried out by reacting said ferrous salt and said alkali carbonate at a molar ratio defined by the following formula (I):

$$1 \leqq \frac{CO_3^{2-} \text{ (mol)}}{Fe^{2+} \text{ (mol)}} \leqq \frac{0.13}{(FeCO_3 \text{ concent. (mol/l)})^2} + 0.6 \quad (I)$$

and said oxidization is carried out at a temperature in the range of 75° to 100° C. and adding, prior to the oxidization and before passing the oxygen-containing gas therethrough, an aliphatic oxycarboxylic acid or a salt thereof in an amount of 0.01 to 2.0 mol % based on Fe to either of said aqueous solution of ferrous salt, said aqueous solution of alkali carbonate or said $FeCO_3$-containing aqueous solution.

2. A process for producing poreless and non-sintered plate-like maghemite particles having an average plate surface diameter of 0.03 to 0.50 μm and a specific surface area of 7 to 30 $m^2/g$, which comprises subjecting the plate-like magnetite particles obtained from the process of claim 1 to oxidation by heating them in air at a temperature of 200° to 400° C.

* * * * *